United States Patent
Sauvlet

(10) Patent No.: US 10,960,743 B2
(45) Date of Patent: Mar. 30, 2021

(54) MOTOR VEHICLE

(71) Applicant: Dr. Ing. h.c. F. Porsche Aktiengesellschaft, Stuttgart (DE)

(72) Inventor: Nils Sauvlet, Rutesheim (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 101 days.

(21) Appl. No.: 16/418,132

(22) Filed: May 21, 2019

(65) Prior Publication Data
US 2019/0375281 A1    Dec. 12, 2019

(30) Foreign Application Priority Data
Jun. 8, 2018   (DE) .......................... 102018113710.9

(51) Int. Cl.
| | | |
|---|---|---|
| *B60R 19/34* | (2006.01) | |
| *B60J 7/16* | (2006.01) | |
| *G05D 1/00* | (2006.01) | |
| *B60J 7/12* | (2006.01) | |
| *B60P 3/34* | (2006.01) | |

(52) U.S. Cl.
CPC ............ *B60J 7/1635* (2013.01); *B60J 7/1256* (2013.01); *B60P 3/341* (2013.01); *G05D 1/00* (2013.01)

(58) Field of Classification Search
CPC .............. Y02T 10/645; Y02T 10/7275; A01M 7/0075; B60G 2400/104; B60P 3/08; G07B 15/063; B62D 1/28; G01S 13/931; G01C 21/28
See application file for complete search history.

(56) References Cited

U.S. PATENT DOCUMENTS

| | | | | |
|---|---|---|---|---|
| 3,902,565 A | * | 9/1975 | Farrall | B60K 1/00 180/65.1 |
| 5,832,757 A | * | 11/1998 | Chikata | E05B 85/243 70/210 |
| 5,951,095 A | * | 9/1999 | Herndon | B60J 7/1621 296/100.09 |
| 5,951,096 A | * | 9/1999 | Steury | B60P 3/34 296/171 |
| 6,126,220 A | * | 10/2000 | Brasher | B60P 1/286 296/26.04 |
| 6,206,456 B1 | * | 3/2001 | Steury | B60P 3/34 254/45 |
| 6,209,944 B1 | * | 4/2001 | Billiu | B60J 7/1614 296/100.02 |
| 6,325,447 B1 | * | 12/2001 | Kuo | B60P 3/341 296/160 |
| 6,425,625 B1 | * | 7/2002 | Messano | B60P 3/34 296/156 |
| 6,443,516 B2 | * | 9/2002 | Lambright | B60P 3/34 296/173 |

(Continued)

FOREIGN PATENT DOCUMENTS

| | | |
|---|---|---|
| AU | 2008258189 A1 | 7/2009 |
| EP | 1595756 A2 | 11/2005 |

*Primary Examiner* — Kiran B Patel
(74) *Attorney, Agent, or Firm* — RatnerPrestia

(57) ABSTRACT

A motor vehicle has a vehicle interior compartment and variable vehicle structures, by way of which the vehicle interior compartment can be modified. In order to improve the comfort in an autonomous driving mode, the vehicle interior compartment is enlarged in an autonomous driving mode.

7 Claims, 2 Drawing Sheets

(56) References Cited

U.S. PATENT DOCUMENTS

| | | | | |
|---|---|---|---|---|
| 6,467,830 B1 * | 10/2002 | Cortright | | B60R 13/06 296/26.04 |
| 6,565,143 B2 * | 5/2003 | Okamoto | | B60P 3/341 296/156 |
| 6,666,490 B1 * | 12/2003 | Thacker | | B60J 7/1614 296/100.08 |
| 6,679,542 B1 * | 1/2004 | Semotuk | | B60P 3/341 296/165 |
| 7,014,238 B2 * | 3/2006 | Gonzalez | | A01M 31/025 135/88.01 |
| 7,226,108 B2 * | 6/2007 | Altman | | B60J 7/1614 296/100.02 |
| 7,243,965 B2 * | 7/2007 | King | | B60J 7/1614 296/164 |
| 7,246,843 B2 * | 7/2007 | Lambright | | B60J 7/1614 296/171 |
| 7,281,744 B1 * | 10/2007 | Schultz | | B60J 7/1621 296/100.1 |
| 7,488,030 B2 * | 2/2009 | Nadeau | | B60P 3/34 296/172 |
| 7,493,727 B1 * | 2/2009 | Broussard | | B60P 3/34 296/156 |
| 7,654,603 B2 * | 2/2010 | Kealy | | B60J 7/1614 296/100.02 |
| 7,758,103 B1 * | 7/2010 | Steury | | B60P 3/34 296/156 |
| 7,810,866 B2 * | 10/2010 | Dempsey | | B62D 63/062 296/173 |
| 7,845,699 B2 * | 12/2010 | Leopold | | B60R 9/055 296/26.04 |
| 8,141,931 B1 * | 3/2012 | Santisi | | B60J 7/1614 296/100.17 |
| 8,439,426 B2 * | 5/2013 | Dempsey | | B60P 3/34 296/173 |
| 8,484,908 B2 * | 7/2013 | Hache | | B60P 3/14 52/143 |
| 8,556,322 B2 * | 10/2013 | Babbage | | B60J 7/1628 296/50 |
| D707,618 S * | 6/2014 | Voglmayr | | D12/414.1 |
| 8,844,212 B1 * | 9/2014 | Trout | | E04B 1/34305 52/67 |
| 8,944,456 B2 * | 2/2015 | Tsukerman | | B62D 31/003 280/638 |
| 9,156,412 B1 * | 10/2015 | Calvert | | B60R 9/065 |
| 9,266,413 B2 * | 2/2016 | Engler | | B60J 5/047 |
| 9,481,404 B1 * | 11/2016 | Rich | | B60P 7/04 |
| 9,676,439 B2 * | 6/2017 | Gokkel | | B62B 7/06 |
| 9,682,848 B2 * | 6/2017 | Griffin, Jr. | | B66C 1/42 |
| 10,017,098 B2 * | 7/2018 | Ronsen | | B60P 3/343 |
| 10,046,628 B1 * | 8/2018 | Fulton | | B60J 7/042 |
| 10,086,684 B1 * | 10/2018 | Stamm, Jr. | | B60J 7/1621 |
| 10,343,586 B2 * | 7/2019 | Stoetzl | | B62D 33/04 |
| 10,414,322 B1 * | 9/2019 | Coulter | | B62D 21/20 |
| 10,538,151 B2 * | 1/2020 | Sullivan | | B60J 7/185 |
| 10,569,624 B2 * | 2/2020 | Sviberg | | B60P 3/34 |
| 10,611,219 B2 * | 4/2020 | Trinier | | B60J 7/1614 |
| 10,618,392 B2 * | 4/2020 | Buschmann | | E01C 19/48 |
| 10,672,327 B1 * | 6/2020 | Hinchman | | B60Q 3/74 |
| 2002/0163221 A1 | 11/2002 | Smith | | |
| 2003/0098590 A1 * | 5/2003 | Chechuck | | B60P 7/08 296/26.04 |
| 2005/0248184 A1 * | 11/2005 | Piffaretti | | B62D 35/005 296/187.03 |
| 2011/0101719 A1 * | 5/2011 | James | | B60P 1/02 296/26.04 |
| 2012/0150394 A1 * | 6/2012 | Schwindaman | | B60P 3/34 701/49 |
| 2012/0223540 A1 * | 9/2012 | Peck | | B60P 3/36 296/26.04 |
| 2013/0009420 A1 * | 1/2013 | Ackermann | | F41H 5/20 296/26.05 |
| 2013/0062900 A1 * | 3/2013 | Bullard | | B60P 3/34 296/26.04 |
| 2017/0136842 A1 * | 5/2017 | Anderson | | B60G 17/0195 |
| 2018/0189716 A1 * | 7/2018 | Crone | | G06Q 10/08355 |
| 2019/0210436 A1 * | 7/2019 | Frederick | | B60J 7/043 |
| 2019/0362295 A1 * | 11/2019 | Kanitz | | B60P 1/36 |
| 2020/0101905 A1 * | 4/2020 | Taylor | | B60J 7/11 |
| 2020/0133288 A1 * | 4/2020 | Abari | | G01S 7/003 |
| 2020/0166924 A1 * | 5/2020 | Pedersen | | B60Q 9/00 |
| 2020/0180653 A1 * | 6/2020 | Chi | | B60W 10/20 |

* cited by examiner

MOTOR VEHICLE

CROSS-REFERENCE TO RELATED APPLICATION

This application claims priority to German Patent application No. DE 10 2018 113 710.9, filed Jun. 8, 2018, which is incorporated by reference herein in its entirety.

FIELD OF THE INVENTION

The invention relates to a motor vehicle having a vehicle interior compartment and having variable vehicle structures, by way of which the vehicle interior compartment can be modified. Furthermore, the invention relates to a method for operating a motor vehicle of this type.

BACKGROUND OF THE INVENTION

Australian standard patent AU 2008258189 B2, which is incorporated by reference herein, has disclosed a vehicle having a fixed base, a top side which can be lifted up, and a flexible wall panel which extends between the fixing base and the top side, and having one or more inflatable vessels which are connected to the flexible wall panel and are suitable for expanding during inflation, in order to bring it about that the top side which can be lifted up is lifted up relative to the fixed base and the interior compartment of the trailer is enlarged as a result. European laid open specification EP 1 595 756 A2, which is incorporated by reference herein, has disclosed a pneumatically inflatable component which is mounted in a stationary manner on a vehicle, the part being mounted on an external point of the vehicle body and, after being pumped up, exerting a protective function for the vehicle or against accidents and/or other functions such as the aerodynamic modification of the vehicle and/or the modification of the useful volume of the vehicle and/or similar functions which increase the safety and reliability of the vehicle. American laid open specification US 2002/0163221 A1, which is incorporated by reference herein, has disclosed a pick-up, the truck bed of which can be enlarged in a flexible manner.

SUMMARY OF THE INVENTION

Described herein is a device to improve the comfort in an autonomous driving mode.

In the case of a motor vehicle having a vehicle interior compartment and having variable vehicle structures, by way of which the vehicle interior compartment can be modified, the object is achieved by virtue of the fact that the vehicle interior compartment is enlarged in an autonomous driving mode. As a result, more space is made available in the interior compartment of the vehicle. As a result, the occupancy of persons in the vehicle interior compartment in the autonomous driving mode is made more comfortable.

One preferred exemplary embodiment of the motor vehicle is distinguished by the fact is that a vehicle interior compartment height is enlarged by way of the variable vehicle structures in the autonomous driving mode. A dimension of the vehicle interior compartment in a z-direction is called a vehicle interior compartment height. The z-direction lies perpendicularly on a plane which is defined by an x-direction and a y-direction of the motor vehicle. The x-direction is also called the vehicle longitudinal direction. The y-direction is also called the vehicle transverse direction.

A further preferred exemplary embodiment of the motor vehicle is distinguished by the fact that the variable vehicle structures comprise a fluid system, in particular a pneumatic system. The variable vehicle structures can be modified reversibly rapidly and simply by way of the fluid system, in particular the pneumatic system.

A further preferred exemplary embodiment of the motor vehicle is distinguished by the fact that the vehicle interior compartment has a lower vehicle interior compartment height in a driving mode which is controlled by a driver than in the autonomous driving mode. As long as the vehicle is being controlled manually by the driver, it is advantageously small and sporty, with the result that the driver is focused on the driving. As soon as the vehicle transfers into an autonomous driving mode or is in said mode, the interior compartment is enlarged, in particular in the upward direction, for example automatically or upon a request from the driver, with the result that vehicle occupants get more freedom of movement, for example for more upright or more relaxed seating positions.

A further preferred exemplary embodiment of the motor vehicle is distinguished by the fact that the vehicle interior compartment height is enlarged by way of the variable vehicle structures in the autonomous driving mode in such a way that at least one person in the vehicle interior compartment can assume an upright and/or more relaxed seating position than in a driving mode which is controlled by a driver. In the autonomous or automated driving mode, the driver can also advantageously assume an upright or more relaxed seating position in the vehicle interior compartment.

A further preferred exemplary embodiment of the motor vehicle is distinguished by the fact that the vehicle interior compartment height is enlarged by way of the variable vehicle structures in the autonomous driving mode in such a way that at least one person in the vehicle interior compartment has more freedom of movement than in a driving mode which is controlled by a driver. As a result, the driving comfort can be increased further.

In the case of a method for operating an above-described motor vehicle, the object specified above is achieved as an alternative or in addition by virtue of the fact that the vehicle interior compartment is enlarged automatically in an autonomous driving mode. It can advantageously be indicated to the vehicle occupants by way of suitable signals, in particular visual and/or acoustic signals, advantageously in the form of speech, that the vehicle interior compartment is enlarged in the autonomous driving mode.

In the case of a method for operating an above-described motor vehicle, the object specified above is achieved as an alternative or in addition by virtue of the fact that the vehicle interior compartment is enlarged in an autonomous driving mode upon a request from the driver. The driver can then possibly indicate to further persons who are seated in the vehicle interior compartment that the vehicle interior compartment is enlarged in the autonomous driving mode.

Furthermore, the invention relates to a computer program product having a program code for carrying out an above-described method. The computer program product comprises a computer program which runs, for example, in a control device of the motor vehicle and/or in the context of a smartphone application.

Moreover, the invention relates to a control device or smartphone application having an above-described computer program product. The control device is arranged in the motor vehicle and is actuated via the computer program product, for example, in such a way that the vehicle interior compartment is enlarged automatically in the autonomous driving mode. Depending on the embodiment, the enlarging of the vehicle interior compartment in the autonomous driving mode can also be controlled via the smartphone application by way of a corresponding smartphone.

BRIEF DESCRIPTION OF THE DRAWING

Further advantages, features and details of the invention result from the following description, in which various exemplary embodiments are described in detail with reference to the drawing. In the drawing:

In FIG. 3A the vehicle structure is shown retracted, and in FIG. 3B the vehicle structure is shown extended.

DETAILED DESCRIPTION OF THE INVENTION

Figure 1:
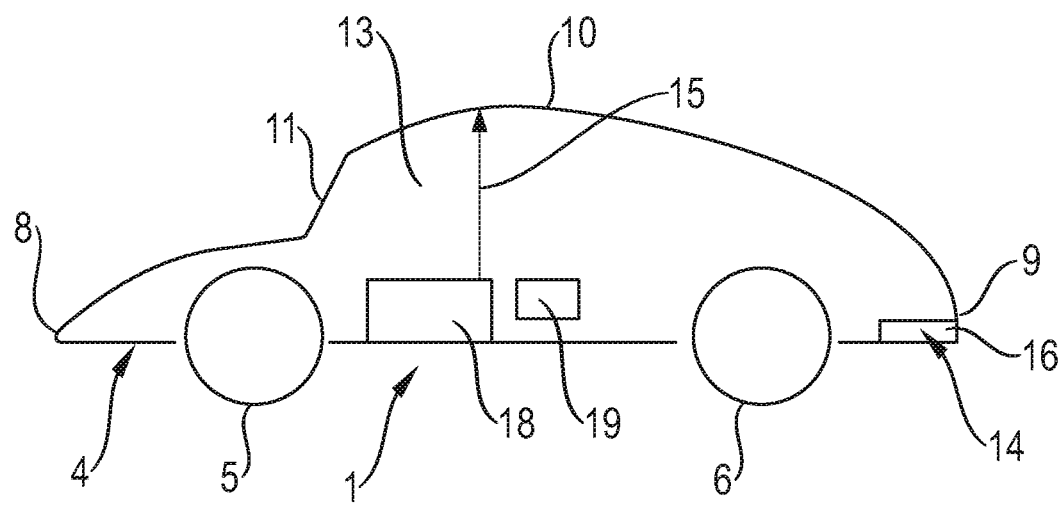
FIG. 1 shows a simplified illustration of a motor vehicle having a vehicle interior compartment and having variable vehicle structures, by way of which the vehicle interior is compartment can be modified, in a driving mode which is controlled by a driver.
Figure 2:
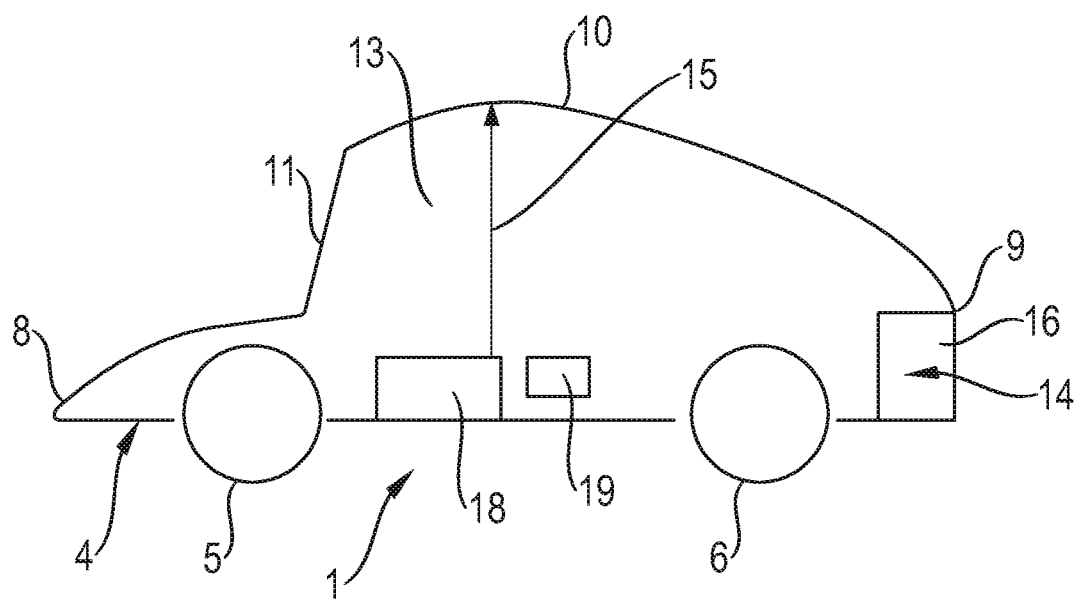
FIG. 2 shows the motor vehicle from FIG. 1 in an autonomous driving mode, in which the vehicle interior compartment of the motor vehicle is enlarged.

FIGS. 1 and 2 show a simplified side view of a motor vehicle 1 which is configured as a passenger car and has a vehicle body 4. Two wheels 5, 6 are indicated by way of two circles in the side view which is shown. In FIGS. 1 and 2, the vehicle body 4 comprises a front 8 on the left hand side. The vehicle body 4 of the passenger car 1 comprises a rear 9 on the right hand side in FIGS. 1 and 2.

The vehicle body 4 is closed at the top by way of a vehicle roof 10 between the front 8 and the rear 9. A front window 11 extends from a front edge of the vehicle roof 10 in the direction of the front 8 of the vehicle body 4. A rear window (not denoted in greater detail) extends from a rear edge of the vehicle roof 10 in the direction of the rear 9 of the passenger car 1.

At least one vehicle seat is arranged in a vehicle interior compartment 13. For example, two or four vehicle seats are arranged in the vehicle interior compartment 13. A vehicle interior compartment height which is indicated by way of an arrow 15 can be modified by way of variable vehicle structures 14. The modification of the vehicle interior compartment height 15 advantageously takes place by way of a fluid system 16, in particular a pneumatic system, by way of which the vehicle interior compartment height 15 can be modified reversibly with the aid of the variable vehicle structures 14.

Figure 3A:
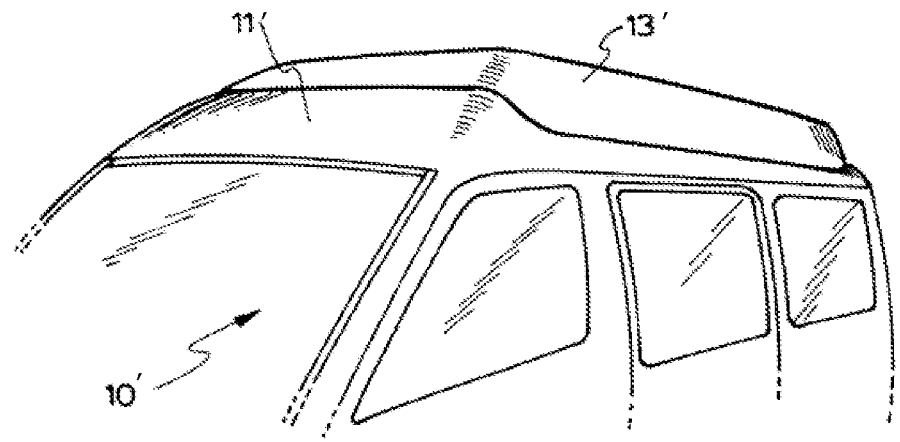
FIGS. 3A and 3B show a variable vehicle structure from AU Patent App. Pub. No. 2008258189.
Figure 3B:
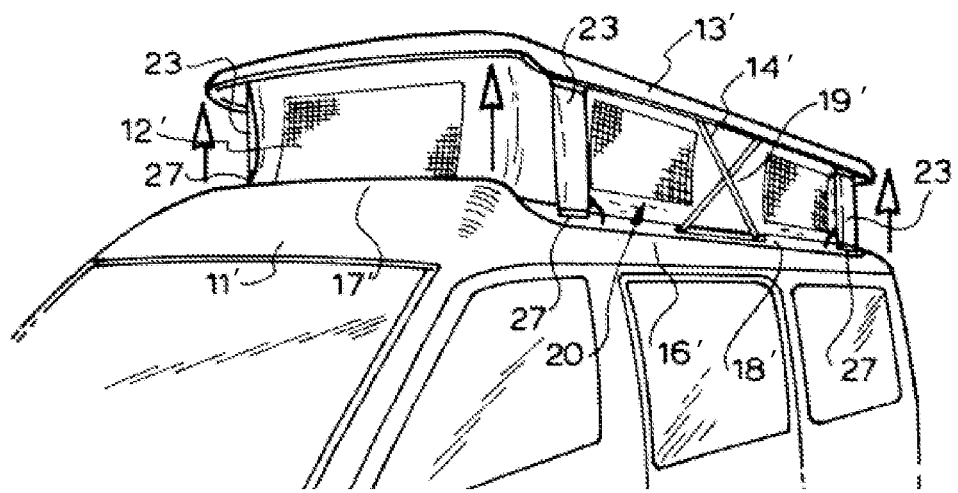

Another motor vehicle 1 having a variable vehicle structure is illustrated in FIGS. 3A and 3B. FIGS. 3A and 3B appear in AU Patent App. Pub. No. 2008258189, which is cited in the background section and is incorporated by reference. The vehicle 10' has a fixed base 11' (which includes the floor and walls of the campervan) with a rectangular opening 12' therein and a top 13' of the type commonly referred to as a "pop-top" mounted to the base part and arranged to open and close the opening by being raised and lowered. Scissor lift type cross arms having gas struts 14' [i.e., a pneumatic system of a variable vehicle structure] are provided on opposite sides of the opening which assist in lifting the pop-top and holding it in the lifted position shown in FIG. 3B. The side and end walls 16' and 17' extend upwards about the opening 12' to form a rim 18' thereabout and a flexible vinyl skirt 19' extends between the base and the pop-top and is secured along its bottom edge 20 to the rim 18' and along its top edge to a similar downwardly directed rim near the periphery of the pop-top to prevent the ingress of rain, dust and the like through the opening. Four spaced apart inflatable elongate polyvinylchloride ("PVC") vessels 23 are each mounted at their lower end portions to the rim 18' and at their upper end portions to the rim of the pop-top, one vessel being located near each of the four corners 27 of the pop-top.

If the motor vehicle 1 is operated in a relatively sporty driving mode by the driver, the vehicle interior compartment height 15 is relatively low, as is seen in FIGS. 1 and 3A, in order not to impair the aerodynamics of the motor vehicle 1 in an undesired way.

If the motor vehicle 1 is driven relatively slowly in an autonomous driving mode, the vehicle interior compartment height 15 can be enlarged (as indicated in FIG. 2 in an exaggerated manner and FIG. 3B) in such a way that at least one person in the vehicle interior compartment 13 can assume an upright seating position with considerably more freedom of movement.

Via a control unit 18 which is integrated into the motor vehicle 1, or via a suitable smartphone application 19, the vehicle interior compartment height 15 can be modified reversibly via the variable vehicle structures 14 with the aid of the fluid system 16.

The modification of the vehicle interior compartment height 15 can be initiated automatically via the control unit 18 when the motor vehicle 1 is operated autonomously. The modification of the vehicle interior compartment height 15 can also be initiated by a driver of the vehicle 1, however, when the driver switches the motor vehicle 1 over to an autonomous driving mode.

What is claimed is:

1. A motor vehicle comprises a vehicle interior compartment, variable vehicle structures that are configured to modify the vehicle interior compartment, and a control unit that is configured to actuate the variable vehicle structure to enlarge the vehicle interior compartment when the motor vehicle is operated in an autonomous driving mode.

2. The motor vehicle as claimed in claim 1, wherein a vehicle interior compartment height is increased by way of the variable vehicle structures when the motor vehicle is operated in the autonomous driving mode.

3. The motor vehicle as claimed in claim 1, wherein the variable vehicle structures comprise a pneumatic system.

4. The motor vehicle as claimed in claim 1, wherein the vehicle interior compartment has a lower vehicle interior compartment height in a driving mode which is controlled by a driver than in the autonomous driving mode.

5. A method for operating a motor vehicle including a vehicle interior compartment and variable vehicle structures that are configured to modify the vehicle interior compartment, said method comprising enlarging the vehicle interior compartment when the vehicle is operated in an autonomous driving mode.

6. The method of claim 5, wherein the vehicle interior compartment is enlarged in the autonomous driving mode upon receiving a request from a driver.

7. The method of claim 5, wherein the vehicle interior compartment is automatically enlarged when the motor vehicle is operated in the autonomous driving mode.

* * * * *